May 29, 1951                    K. LARSEN                    2,554,833
                                 COMPASS
                            Filed May 22, 1948

INVENTOR.
Kristen Larsen
BY

Patented May 29, 1951

2,554,833

UNITED STATES PATENT OFFICE 2,554,833

COMPASS

Kristen Larsen, Norre-Sundby, Denmark

Application May 22, 1948, Serial No. 33,859
In Denmark June 20, 1947

7 Claims. (Cl. 33—225)

The present invention relates to improvements in compasses.

In hitherto known compasses the compensation devices for reducing deviation caused by local magnetic fields within the vessel consist of removable magnets so placed at either side of the magnet needle within the binnacle that by their proper adjustment deviation may be reduced to a minimum value.

The object of the present invention is to replace this plurality of magnets distributed to either side of the compass needle, by a single magnet so that correction of deviation is essentially facilitated. To this end the single compensating magnet is disposed vertically to the rotation plane of the magnet needle and is so arranged that it may be inclined in relation to this plane for reducing deviation.

By means of such an arrangement of the compensating magnet it is possible to obtain an automatic reduction of deviation in practically every angle in relation to east-west. This is rendered possible by mounting the compensating magnet upon a rotatable adjusting member and connecting it to members which, for instance by means of a cam device, automatically adjust the compensating magnet to the position necessary for reducing deviation in any particular direction.

Figure 1:
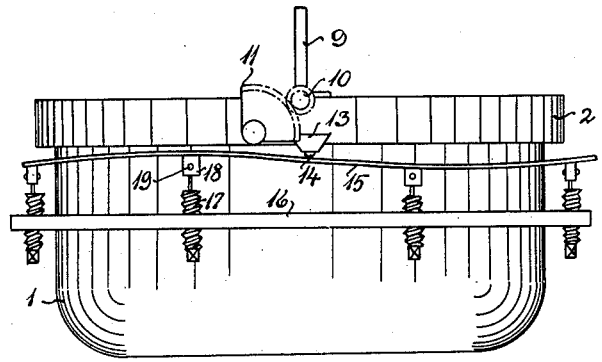
Figure 2:
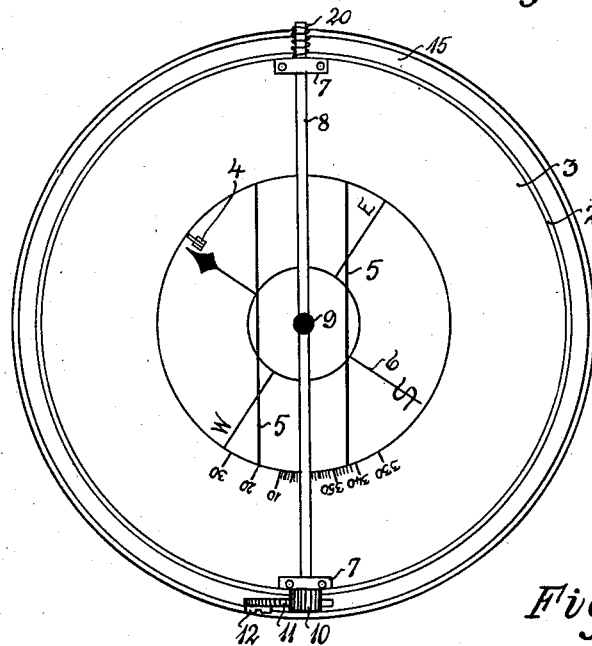

A practical manner of construction of a compass according to the invention is illustrated in the accompanying drawing, in which Fig. 1 is a side elevation of the compass and Fig. 2 is a plan view of the same compass.

Referring to the drawing, the compass bowl 1 is mounted in conventional manner within a binnacle of known construction, not shown in the drawing. Within the bowl 1 the compass card is supported above its centre of gravity. Above this card is mounted a rotatable ring 2 arranged coaxial to the centre of the compass and carrying a heavy glass plate 3 provided with a graduation of 360°, only a portion of which is shown in Fig. 2. The compass bowl 1 has a fixed adjustment mark 4 rigidly connected to the compass bowl by means of two supports 4a by means of which the plate 3 and with it the ring 2 can be adjusted in any one of the eight main directions of the compass system, or to any desired number of degrees to the one or the other side thereof. The mentioned mark 4 is normally disposed forwardly in relation to the ship when standing aft of the compass. The glass plate 3 has two relatively parallel lines 5 which are adjusted together with the ring 2, and the operator need only take care that the compass needle indicated by 6 is always in a position parallel to these lines, in order to maintain the course.

Diametrically traversing the glass plate 3 a shaft 8 is journaled in bearings 7 attached to the ring 2. This shaft has attached to it immediately above the centre of the compass card a compensating magnet 9. Outside the ring 2 the one end of this shaft carries a pinion 10 that engages a toothed segment 11 pivotally mounted on a pin 12 attached to the ring 2.

This toothed segment 11 carries a dog 13 which by means of for instance a small roller 14 rests upon an annular cam 15 made of thin metal sheet. A number, for instance eight, screws 17 are screwed through a ring 16 rigidly attached to and encompassing the compass bowl 1, and each screw has a square head so that it may be adjusted by means of a socket spanner. The annular cam member 15 has attached to its lower surface a number of U-shaped lugs 18, each of which is pivotally attached to one of the screws 17 by means of a pin 19.

The dog 13 on the toothed segment 11 is held in abutment against the cam surface by means of a coil spring 20 on the end of the shaft 8 opposite that carrying the pinion 10.

Compensation of the eight main directions of the compass system is made at suitable intervals by raising or lowering the cam by means of the eight screws 17, and through the dog 13, the toothed segment 11, the pinion 10 and the shaft 8, the inclination of the compensating magnet 9 is adjusted in such a manner that deviation is reduced for these eight main directions.

The operator thus need not make any calculations whatever of the deviations, but has only to turn the ring 2 for adjusting the compensating magnet to automatically reduce deviation.

The main idea of the present invention, and that which renders possible reduction of deviation is thus the arrangement of the straight compensating bar magnet vertically to the rotational plane of the compass card upon the intermediate portion thereof, and the provision of appropriate means for adjusting it to a suitable inclination to reduce deviation. These means may be others than the cam member 15 shown, and the invention includes thus the employment of an adjustable compensating member arranged vertically to the plane of rotation of the compass card in connection with other operating and adjustment members than those illustrated.

I claim:

1. A compensating device for a magnetic compass having a compass bowl, a suspended compass card with a magnetic compass needle, and a course card, said compensating device including a straight compensating bar magnet located intermediately above said compass card and extending upwardly; and pivotal support means for pivotally supporting the lower end of the bar magnet above the point of suspension of the compass card so that the upper end of said bar magnet is oscillatable in a plane at right angles to the horizontal plane of the magnetic compass needle in such manner that the magnetic influence of said bar magnet is thus variable according to the cosine of the angle disposed between the longitudinal axis of said bar magnet and the horizontal plane.

2. A compensating device for a magnetic compass having a compass bowl, a suspended compass card with a magnetic compass needle, and a course card, said compensating device including a straight compensating bar magnet located intermediately above said compass card and extending upwardly; and pivotal support means for mounting the lower end of the bar magnet in neutral relation to the free rotation of the compass card in the horizontal plane effective to pivotally support said lower end of said bar magnet above the point of suspension of said compass card and limit movement of said bar magnet so that said upper end thereof is oscillatable in a plane at right angles to the horizontal plane of the magnetic compass needle in such manner that the magnetic influence of said bar magnet is thus variable according to the cosine of the angle disposed between the longitudinal axis of said bar magnet and the horizontal plane.

3. A compensating device for a magnetic compass having a compass bowl, a suspended compass card with a magnetic compass needle, and a course card, said compensating device including a straight compensating bar magnet located intermediately above said compass card and extending upwardly with the polarity of the upper end of the bar magnet opposite to that of the north end of the compass needle in order to effect compensation exclusively by means of said upper end of said bar magnet; and pivotal support means for pivotally supporting the lower end of the bar magnet above the point of suspension of the compass card so that the upper end of said bar magnet is oscillatable in a plane at right angles to the horizontal plane of the magnetic compass needle in such manner that the magnetic influence of said bar magnet is thus variable according to the cosine of the angle disposed between the longitudinal axis of said bar magnet and the horizontal plane.

4. A compensating device for a magnetic compass having a compass bowl, a suspended compass card with a magnetic compass needle, and a course card, said compensating device including a continuous cam disposed exteriorly of the compass bowl and having an upwardly facing cam surface; a diametrically disposed horizontal shaft rotatably mounted substantially in a north-south position with respect to the course card; a cam follower connected to the course card and extending movably from said course card into effective contact with the cam surface of said cam; a compensating bar magnet having one end mounted upon the horizontal shaft above the point of suspension of the compass card, with the other end of said bar magnet extending upwardly and oscillatable exclusively about the horizontal axis of said shaft in a plane at right angles to the horizontal plane of the magnetic compass needle in such manner that the magnetic influence of said bar magnet is thus variable according to the cosine of the angle disposed between the longitudinal axis of said bar magnet and the horizontal plane; means upon said horizontal shaft effective to alter the position of the cam follower with respect to said course card; and further means on said horizontal shaft for retaining said cam follower resiliently in effective operative contact with said cam.

5. A compensating device for a magnetic compass having a compass bowl, a suspended compass card with a magnetic compass needle, and a course card, said compensating device including an adjustable ring-shaped cam surrounding the exterior of the compass bowl having an upwardly facing cam surface; a diametrically disposed horizontal shaft rotatably mounted substantially in a north-south position with respect to the course card; a cam follower connected to the course card and extending movably from said course card into effective contact with the cam surface of said cam; a plurality of adjusting members connected to said compass bowl and connected to and supporting said ring-shaped cam for adjusting portions of the latter in order to vary the upward extension thereof; a compensating bar magnet having one end mounted upon the horizontal shaft above the point of suspension of the compass card, with the other end of said bar magnet extending upwardly and oscillatable exclusively about the horizontal axis of said shaft in a plane at right angles to the horizontal plane of the magnetic compass needle in such manner that the magnetic influence of said bar magnet is thus variable according to the cosine of the angle disposed between the longitudinal axis of said bar magnet and the horizontal plane; means upon said horizontal shaft effective to alter the position of the cam follower with respect to said course card; and further means on said horizontal shaft for retaining said cam follower resiliently in effective operative contact with said cam.

6. A compensating device for a magnetic compass having a compass bowl, a suspended compass card with a magnetic compass needle, and a course card with a compensating device including a ring fixed upon the course card and rotatably mounted therewith upon the compass bowl in a position to surround the upper portion thereof; an adjustable ring-shaped cam surrounding the exterior of said compass bowl out of contact with the ring on the course card and having an upwardly facing cam surface; a plurality of adjusting members connected to said compass bowl and connected to and supporting said ring-shaped cam for adjusting portions of the latter to vary the form and upward extension thereof; a cam follower pivotally mounted for movement about a horizontal axis on said ring in effective position to ride upon said ring-shaped cam; a diametrically disposed horizontal shaft rotatably mounted in a substantially north-south position with respect to said ring and said course card; means on one end of the horizontal shaft engaging with the cam follower effective to raise or lower it with respect to said ring; further means on the horizontal shaft effective to resiliently maintain said horizontal shaft with its follower-engaging means and the cam follower in operative position with respect to said cam; and a compensating bar magnet having one end thereof mounted on the intermediate portion of said horizontal shaft above the point of suspension of the compass card with the other end of the bar magnet extending upwardly and oscillatable about the horizontal axis of said horizontal shaft in a plane at right angles to the horizontal plane of the magnetic compass needle in such manner that the magnetic influence of said bar magnet is thus variable according to the cosine of the angle disposed between the longitudinal axis of said bar magnet and the horizontal plane.

7. A compensating device for a magnetic compass having a compass bowl, a suspended compass card with a magnetic compass needle, and a course card, said compensating device including a ring fixed upon the course card and rotatably mounted therewith upon the compass bowl in a position to surround the upper portion thereof; an adjustable ring-shaped and continuous flexible cam surrounding the exterior of said compass bowl out of contact with the ring on the course card and having an upwardly facing cam surface; a plurality of adjusting members connected to said compass bowl and connected to and supporting said ring-shaped cam for adjusting portions of the latter to vary the form and upward extension thereof; a gear segment rotatably mounted upon said ring exteriorly of said course card for rotation about a horizontal axis and having a projecting portion forming a cam follower riding upon the cam surface of said ring-shaped cam; a pair of aligned bearings fixed at the diametrically opposite sides upon said ring and course card and substantially coinciding with a north-south position on the latter; a horizontal shaft rotatably mounted in said bearings and disposed transversely of said course card; a pinion secured on one end of the horizontal shaft and meshing with said gear segment for raising or lowering said cam follower upon rotation of said horizontal shaft; a spring on another portion of said horizontal shaft for resiliently maintaining said horizontal shaft with its pinion and the cam follower in effective operative position with respect to said ring-shaped cam; and a compensating bar magnet having one end thereof mounted on the intermediate portion of said horizontal shaft above the point of suspension of the compass card with the other end of the bar magnet extending upwardly and oscillatable about the horizontal axis of said horizontal shaft in a plane at right angles to the horizontal plane of the magnetic compass needle in such manner that the magnetic influence of said bar magnet is thus variable according to the cosine of the angle disposed between the longitudinal axis of said bar magnet and the horizontal plane.

KRISTEN LARSEN.

REFERENCES CITED

The following references are of record in the file of this patent:

UNITED STATES PATENTS

| Number | Name | Date |
|---|---|---|
| 2,078,574 | Kollsman | Apr. 27, 1937 |

FOREIGN PATENTS

| Number | Country | Date |
|---|---|---|
| 2,820 | Great Britain | Sept. 24, 1872 |